(12) United States Patent
Radcliffe et al.

(10) Patent No.: US 9,862,124 B2
(45) Date of Patent: Jan. 9, 2018

(54) MULTILAYER OPTICAL ADHESIVES AND METHODS OF MAKING SAME

(71) Applicant: 3M INNOVATIVE PROPERTIES COMPANY, St. Paul, MN (US)

(72) Inventors: Marc D. Radcliffe, Newport, MN (US); Daniel W. Hennen, Cottage Grove, MN (US); Brett J. Sitter, Cottage Grove, MN (US); Michael L. Steiner, New Richmond, WI (US); Thomas R. Hoffend, Jr., Woodbury, MN (US); Audrey A. Sherman, Woodbury, MN (US); John J. Stradinger, Roseville, MN (US); Olester Benson, Jr., Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 464 days.

(21) Appl. No.: 14/335,326

(22) Filed: Jul. 18, 2014

(65) Prior Publication Data

US 2016/0016338 A1    Jan. 21, 2016

(51) Int. Cl.
| | |
|---|---|
| B32B 7/12 | (2006.01) |
| B29C 41/22 | (2006.01) |
| C09J 7/00 | (2006.01) |
| B29D 11/00 | (2006.01) |
| C09J 7/02 | (2006.01) |
| B29L 11/00 | (2006.01) |

(52) U.S. Cl.
CPC .......... *B29C 41/22* (2013.01); *B29D 11/0073* (2013.01); *C09J 7/00* (2013.01); *C09J 7/02* (2013.01); *B29L 2011/00* (2013.01); *C09J 2201/36* (2013.01); *C09J 2201/622* (2013.01)

(58) Field of Classification Search
CPC ......... B29C 41/22; B29D 11/0073; C09J 7/00
See application file for complete search history.

(56) References Cited

U.S. PATENT DOCUMENTS

| 4,374,077 A | 2/1983 | Kerfeld |
| 4,576,850 A | 3/1986 | Martens |
| 4,972,117 A | 11/1990 | Adler |

(Continued)

FOREIGN PATENT DOCUMENTS

| EP | 1420273 | 5/2004 |
| JP | 2001-154007 | 6/2001 |

(Continued)

OTHER PUBLICATIONS

Translation of JP 2012-184423. See above for date and inventor.*

*Primary Examiner* — Victor Chang
(74) *Attorney, Agent, or Firm* — Clifton F. Richardson

(57) ABSTRACT

A multilayer optical adhesive including a first viscoelastic or elastomeric adhesive layer and a second viscoelastic or elastomeric adhesive layer. A crosslinked or soluble resin layer may be disposed between the first viscoelastic or elastomeric adhesive layer and the second viscoelastic or elastomeric adhesive layer or the first viscoelastic or elastomeric adhesive layer may be immediately adjacent to the second viscoelastic or elastomeric adhesive layer. An interface between immediately adjacent layers is structured and there is a difference in refractive indices across the interface.

13 Claims, 8 Drawing Sheets

(56) References Cited

U.S. PATENT DOCUMENTS

| | | |
|---|---|---|
| 5,039,907 A | 8/1991 | Adler |
| 5,175,030 A | 12/1992 | Lu |
| 5,271,968 A | 12/1993 | Coyle |
| 5,534,391 A | 7/1996 | Wang |
| 5,558,740 A | 9/1996 | Bernard |
| 5,760,955 A | 6/1998 | Goldenberg |
| 5,995,690 A | 11/1999 | Kotz |
| 6,197,397 B1 | 3/2001 | Sher |
| 7,140,812 B2 | 11/2006 | Bryan |
| 7,927,703 B2 | 4/2011 | Xia |
| 8,114,248 B2 | 2/2012 | Lee |
| 8,323,773 B2 | 12/2012 | Flanigan |
| 8,378,046 B2 | 2/2013 | Determan |
| 8,619,363 B1 | 12/2013 | Coleman |
| 2005/0094273 A1 | 5/2005 | Takao |
| 2005/0134963 A1 | 6/2005 | Stevenson et al. |
| 2007/0054133 A1 | 3/2007 | Sherman et al. |
| 2007/0212535 A1 | 9/2007 | Sherman |
| 2008/0156421 A1 | 7/2008 | Lee |
| 2011/0122494 A1 | 5/2011 | Sherman |
| 2011/0134623 A1 | 6/2011 | Sherman |
| 2011/0165361 A1 | 7/2011 | Sherman |
| 2011/0176325 A1 | 7/2011 | Sherman |
| 2011/0182076 A1 | 7/2011 | Sherman |
| 2012/0038990 A1 | 2/2012 | Hao |
| 2012/0201049 A1 | 8/2012 | Sherman |
| 2012/0300307 A1 | 11/2012 | Borrelli |
| 2013/0011608 A1 | 1/2013 | Wolk |
| 2013/0127689 A1 | 5/2013 | Gollier |
| 2013/0338251 A1 | 12/2013 | Joly |

FOREIGN PATENT DOCUMENTS

| | | | | |
|---|---|---|---|---|
| JP | 2009-276687 | | 11/2009 | |
| JP | 2012184423 A | * | 9/2012 | ............ C09J 133/04 |
| WO | WO 03-031529 | | 4/2003 | |
| WO | WO 2006-006358 | | 1/2006 | |
| WO | WO 2011-088216 | | 7/2011 | |
| WO | WO 2012-050663 | | 4/2012 | |
| WO | WO 2013-062996 | | 5/2013 | |
| WO | WO 2013-074325 | | 5/2013 | |

* cited by examiner

MULTILAYER OPTICAL ADHESIVES AND METHODS OF MAKING SAME

BACKGROUND

Structured films for use in optical applications are typically made on a carrier film such as polyethylene terephthalate (PET) having a thickness large enough that the carrier film is self-supporting. Such carrier films add unwanted thickness to the structured films and can produce unwanted optical artifacts. A structured film may include an adhesive layer so that the structured film can be adhered to a display. A need exists for thinner structured articles that do not produce unwanted optical artifacts and that can be adhered to a display.

SUMMARY

In some aspects, the present description relates to an optical adhesive including a first viscoelastic or elastomeric adhesive layer, a first crosslinked or soluble resin layer immediately adjacent the first viscoelastic or elastomeric adhesive layer, and a second viscoelastic or elastomeric adhesive layer immediately adjacent the first crosslinked or soluble resin layer opposite the first viscoelastic or elastomeric adhesive layer. The first viscoelastic or elastomeric adhesive layer has a first refractive index and the first crosslinked or soluble resin layer has a second refractive index different from the first refractive index. A first interface between the first viscoelastic or elastomeric adhesive layer and the first crosslinked or soluble resin layer is structured and each of the first viscoelastic or elastomeric adhesive layer, the first crosslinked or soluble resin layer and the second viscoelastic or elastomeric adhesive layer are substantially transmissive.

In some aspects, the present description relates to an optical adhesive including a first viscoelastic or elastomeric adhesive layer having a first major surface and an unstructured second major surface, and a second viscoelastic or elastomeric adhesive layer immediately adjacent the first major surface of the first viscoelastic or elastomeric adhesive layer. The first viscoelastic or elastomeric adhesive layer has a first refractive index $n_1$ and the second viscoelastic or elastomeric adhesive has a second refractive index $n_2$. A first interface between the first viscoelastic or elastomeric adhesive layer and the second viscoelastic or elastomeric adhesive layer includes a substantially continuous grating having a peak to valley height h and a pitch and h multiplied by $|n_1-n_2|$ is in a range of about 150 nm to about 350 nm and the pitch is in a range of about 2 microns to about 50 microns.

In some aspects, the present description relates to an optical adhesive including a viscoelastic or elastomeric adhesive layer having a first major surface, a discontinuous layer immediately adjacent the first major surface of the viscoelastic or elastomeric adhesive layer, and an additional layer disposed immediately adjacent the discontinuous layer opposite the viscoelastic or elastomeric adhesive layer. The additional layer is in contact with the viscoelastic or elastomeric adhesive layer. The viscoelastic or elastomeric adhesive layer has a first refractive index $n_1$; the discontinuous layer has a second refractive index $n_2$ different from $n_1$; and the additional layer has a third refractive index $n_3$. A first interface between the viscoelastic or elastomeric adhesive layer and the discontinuous layer, a second interface between the additional layer and the discontinuous layer, and a third interface between the viscoelastic or elastomeric adhesive layer and the additional layer includes a grating having a peak to valley height h and a pitch and wherein h multiplied by $|n_1-n_2|$ is in a range of about 150 nm to about 350 nm and the pitch is in a range of about 2 microns to about 50 microns.

In some aspects, the present description relates to an optical adhesive including a first release film having a first release surface, a viscoelastic or elastomeric adhesive layer immediately adjacent the first release surface, a hardcoat layer immediately adjacent the viscoelastic or elastomeric adhesive layer opposite the first release film, and a second release film having a second release surface immediately adjacent the hardcoat layer. The second release film has an unstructured surface opposite the second release surface. A first interface between the second release film and the hardcoat is structured and each of the viscoelastic or elastomeric adhesive layer and the hardcoat layer are substantially transmissive.

In some aspects, the present description relates to a method of making an optical adhesive that includes the steps of providing a first release tool having a structured first release surface; coating a first material onto the structured first release surface thereby forming a first layer having a first refractive index; applying a second material and a second release tool having a second release surface onto the first material with the second material immediately adjacent the first material opposite the first release tool, the second release tool immediately adjacent the second material opposite the first material, and the second release surface facing the second material; removing the first release tool thereby exposing a structured major surface of the first layer; and applying a third material onto the structured major surface. The second material forms a second layer having a second refractive index and the third material forms a third layer having a third refractive index different from the first refractive index. The first material is a first coatable resin and the second material is a first viscoelastic or elastomeric adhesive.

In some aspects, the present description relates to a method of making an optical adhesive that includes the steps of providing a first release tool having a structured first release surface; coating a first material onto the structured first release surface thereby forming a first layer having a first refractive index; applying a second release tool having a second release surface onto the first layer with the second release surface immediately adjacent the first layer opposite the first release tool; removing the first release tool thereby exposing a first structured surface of the first layer; and applying a first viscoelastic or elastomeric adhesive onto the first structured surface, the first viscoelastic or elastomeric adhesive forming a second layer having a second refractive index different from the first refractive index.

DETAILED DESCRIPTION

Figure 1:
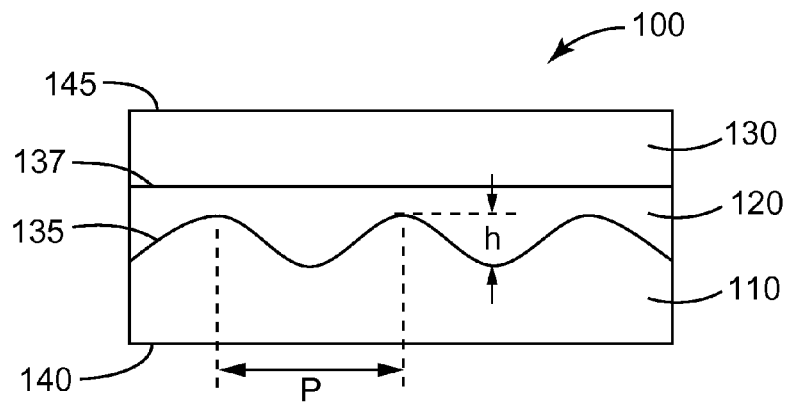
FIG. 1 is a cross-sectional view of a multilayer optical adhesive.

In the following description, reference is made to the accompanying set of drawings that form a part of the description hereof and in which are shown by way of illustration specific embodiments. The figures are not necessarily to scale. Unless indicated otherwise, similar features for one embodiment may include the same materials, have the same attributes, and serve the same or similar functions as similar features for other embodiments. Additional or optional features described for one embodiment may also be additional or optional features for other embodiments, even if not explicitly stated, where appropriate. It is to be understood that other embodiments are contemplated and may be made without departing from the scope or spirit of the present description. The following detailed description, therefore, is not to be taken in a limiting sense.

As used herein, layers, components, or elements may be described as being adjacent one another. Layers, components, or elements can be adjacent one another by being in direct contact, by being connected through one or more other components, or by being held next to one another or attached to one another. Layers, components, or elements that are in direct contact may be described as being immediately adjacent.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Multilayered articles having a structured surface or structured interface can provide useful optical effects. For example, the structured surface or structured interface can provide refraction or diffraction of a light that is transmitted through the article. Such multilayered articles can be made on a carrier film such as polyethylene terephthalate (PET). However, it is often desired to use a multilayered article in a display or other optical application where it is desired for the article to be thin. Using a carrier film can add unwanted thickness to the multilayered article. Using a carrier film can also add deleterious optical effects. For example, carrier films, which are typically high molecular weight thermoplastic polymer films such as PET, have some degree of birefringence which can result in unwanted optical artifacts. In addition, the use of carrier films can degrade the transmittance of the multilayer article by providing additional interfaces that reflect some portion of light incident on the article. It is often desired to adhere the multilayer article to a surface of a display. For example, a multilayer article may be adhered to an outer glass surface of a display or a multilayered article may be adhered to both an inner surface of a glass layer and an outer surface of a display panel. This can be can be done by using adhesive layer(s) with the multilayered articles. As described herein, it has been discovered that optically useful multilayer optical adhesives having a structured interface or structured surface can be made without using a non-sacrificial carrier film. The multilayer optical adhesives typically include at least one viscoelastic or elastomeric adhesive layer as an outer layer. Such multilayer optical adhesives may include release liner(s) adjacent the outer adhesive layer(s) which function as sacrificial layer(s) that are removed prior to use in a display application.

A multilayer optical adhesive according to the present description is shown in FIG. 1. Optical adhesive 100 includes a first layer 110, a second layer 120 immediately adjacent first layer 110, and a third layer 130 immediately adjacent second layer 120 opposite first layer 110. In some embodiments, first layer 110 is a first viscoelastic or elastomeric adhesive layer, second layer 120 is a crosslinked or soluble resin layer and third layer 130 is a second viscoelastic or elastomeric adhesive layer.

Viscoelastic or elastomeric adhesives may be pressure-sensitive adhesives (PSAs), rubber-based adhesives (e.g., rubber, urethane) and silicone-based adhesives. Viscoelastic or elastomeric adhesives also include heat-activated adhesives which are non-tacky at room temperature but become temporarily tacky and are capable of bonding to a substrate at elevated temperatures. Heat activated adhesives are activated at an activation temperature and above this temperature have similar viscoelastic characteristics as PSAs. Viscoelastic or elastomeric adhesives may be substantially transparent and optically clear. Any of the viscoelastic or elastomeric adhesives of the present description may be viscoelastic optically clear adhesives. Elastomeric materials may have an elongation at break of greater than about 20 percent, or greater than about 50 percent, or greater than about 100 percent. Viscoelastic or elastomeric adhesive layers may be applied directly as a substantially 100 percent solids adhesive or may be formed by coating a solvent-borne adhesive and evaporating the solvent. Viscoelastic or elastomeric adhesives may be hot melt adhesives which may be melted, applied in the melted form and then cooled to form a viscoelastic or elastomeric adhesive layer.

Suitable viscoelastic or elastomeric adhesives include elastomeric polyurethane or silicone adhesives and the viscoelastic optically clear adhesives CEF22, 817x, and 818x, all available from 3M Company, St. Paul, Minn. Other useful viscoelastic or elastomeric adhesives include PSAs based on styrene block copolymers, (meth)acrylic block copolymers, polyvinyl ethers, polyolefins, and poly(meth)acrylates.

Crosslinked or soluble resins may be used in multilayer optical adhesives of the present description. Crosslinkable or curable resins may be deposited or coated onto a surface in liquid form and then the coating cured, for example, by applying actinic radiation or heat, to form a crosslinked resin layer. The actinic radiation used to cure the coating of curable resin may be e-beam or ultraviolet (UV) radiation. Crosslinking a coated resin in this way can result in a layer with low or substantially no birefringence.

Suitable curable resins for use in optical adhesives of the present disclosure include UV-curable acrylates, such as such as polymethyl methacrylate (PMMA), aliphatic urethane diacrylates (such as Photomer 6210, available from Sartomer Americas, Exton, Pa.), epoxy acrylates (such as CN-120, also available from Sartomer Americas), and phenoxyethyl acrylate (available from Sigma-Aldrich Chemical Company, Milwaukee, Wis.). Other suitable curable resins include moisture cured resins such as Primer M available from MAPEI Americas (Deerfield Beach, Fla.). Additional suitable viscoelastic or elastomeric adhesives and additional suitable crosslinkable resins are described in U.S. Pat. App. Pub. No. 2013/0011608 (Wolk et al.).

As used herein, a "soluble resin" is a resin having the material property that it is soluble in a solvent that is suitable for use in a web coating process. In some embodiments, soluble resins are soluble to at least 3 weight percent, or at least 5 weight percent, or at least 10 weight percent or at least 20 weight percent or at least 50 weight percent at 25° C. in at least one of methyl ethyl ketone (MEK), toluene, ethyl acetate, acetone, methanol, ethanol, isopropanol, 1,3 dioxolane, tetrahydrofuran (THF), water and combinations thereof. A soluble resin layer may be formed by coating a solvent-borne soluble resin and evaporating the solvent. Soluble resin layers may have low or substantially no birefringence. Suitable soluble resins include VITEL 1200B available from Bostik, Inc. (Wauwatosa, Wis.), PRIPOL 1006 available from Croda USA (New Castle, Del.), and soluble aziridine resins as described, for example, in U.S. Pat. No. 5,534,391 (Wang).

An interface 135 between the first layer 110 and the second layer 120 is structured. Interface 135 is configured to provide a desired optical effect. For example, the geometry of the interface and the index contrast across interface 135 (i.e., the absolute value of the difference in refractive index of materials on either side of interface 135) can be chosen so that a least a portion of light incident on interface 135 is refracted or diffracted by interface 135. First layer 110 may have a first refractive index $n_1$, second layer 120 may have a second refractive index $n_2$ which may be different from the first refractive index $n_1$, and third layer 130 may have a third refractive index $n_3$.

The index contrast across a structured interface in any of the embodiments of the present description may be selected to achieve a desired optical effect. In any of the embodiments of the present description, the magnitude (i.e., absolute value) of the difference between the refractive indices of the materials on either side of any structured interface (i.e., the refractive index contrast across the interface) may be at least 0.001 or at least 0.003 or at least 0.005 or at least 0.008 or at least 0.01. In some embodiments, the refractive index contrast may be less than about 0.5 or less than about 0.4 or less than about 0.2. In some embodiments, the refractive index contrast across an interface is at least 0.001 and less than about 0.5. In the embodiment shown in FIG. 1, magnitude of the difference between the refractive indices of the materials on either side of interface 135 (i.e., the refractive index contrast of interface 135) is given by $|n_1 - n_2|$. In some embodiments, interface 135 includes a grating having a peak to valley height of h and a pitch of P. As used herein, an interface between two transparent or semi-transparent materials may be said to be a grating or to include a grating if the interface has a periodic or quasi-periodic structure that provides at least some diffraction of a visible light incident on the interface.

Any of the layers of the multilayer adhesives of the present description may contain fillers, such as inorganic nanoparticles, to adjust the refractive index of the layer. For example, first layer 110 and/or third layer 130 may be viscoelastic or elastomeric adhesive layers having nanoparticles disbursed in the adhesive. Similarly, second layer 120 may be a crosslinked or coatable resin layer that contains inorganic nanoparticles. Suitable nanoparticles include zirconia nanoparticles. The nanoparticles may have a volume-average diameter in the range of about 1 nm to about 50 nm or in a range of about 2 nm to about 25 nm. Additional suitable nanoparticles are described in U.S. Pat. App. Pub. No. 2013/0338251 (Joly et al.). The refractive index of such layers may be greater than about 1.55, or greater than about 1.6, or greater than about 1.65, for example. The second layer 120 may be an ultra low index (ULI) layer; for example, a nanovoided ULI layer as described in U.S. Pat. App. Pub. No. 2012/0038990 (Hao et al.). Such ULI layers may have a refractive index less than about 1.35 or less than about 1.3, or less than about 1.25, or less than about 1.2, or less than about 1.15.

For any of the embodiments discussed herein, the pitch for any grating may be greater than about 1 micron, or greater than about 2 microns, or greater than about 4 microns or greater than about 6 microns and may be less than about 60 microns, or less than about 50 microns, or less than about 40 microns or less than about 30 microns. For example, in some embodiments the pitch is between about 2 microns and about 50 microns or between about 4 microns and about 40 microns.

The pitch and height may be chosen to produce diffraction and/or refraction of at least a portion of a light incident on the grating. In some embodiments, the structured interface(s) is a random, pseudo-random or other irregular structure.

In some embodiments, the multilayer optical adhesives of the present description may be used in a display in order to reduce sparkle in the display. Sparkle in a display can be caused by light from a pixel interacting with a non-uniformity in the in the optical path of the light, typically on the surface of a display. Light from a pixel may appear to move around or flicker as the viewer moves due to the interaction of the pixel light with the non-uniformity. Such non-uniformities can include structure or surface texture from a film or other layer that might be added to a display. For example, surface texture in anti-glare films is often included in order to reduce specular reflection from the surface thereby reducing glare. Non-uniformities that can generate sparkle also include fingerprints, scratches or other residue on the display surface. Sparkle can be reduced by using periodic structures (i.e., grating) as described in U.S. Pat. App. Pub. No. 2012/0300307 (Borrelli et al.). Grating structures that generate a controlled degree of diffraction are described in U.S. Prov. App. Ser. No. 62/011,972 entitled OPTICAL STACKS FOR SPARKLE REDUCTION and filed on Jun. 13, 2014, which is hereby incorporated herein by reference in its entirety. Typically, it is desired that the diffraction grating produce low order diffraction peaks which reduce sparkle without sacrificing perceived image resolution. The structured interfaces of the multilayer optical adhesives of the present description can include gratings that are effective at producing diffraction of light from a display incident on a major surface of the optical adhesives. The multilayer optical adhesives may be applied to the outside of a cover glass of a display or may be applied between a cover glass and a display panel.

The distribution of intensity of the diffraction peaks generated by diffraction gratings is a function of the product of the index contrast across the grating and the peak to valley height of the grating. As used herein, refractive index and index contrast refers to refractive index measurements using light having a wavelength of 532 nm at 25° C. and atmospheric pressure unless otherwise indicated. The index contrast times the peak to valley height can be adjusted so that diffraction peaks that reduce sparkle appear with a relative high intensity while diffraction peaks that would degrade effective resolution appear with low intensity or do not measurably appear at all. The range of useful values for the product of the index contrast and the peak to valley height may depend on the shape of the grating. The gratings may have any periodically repeating shape, for example a sinusoidal shape, a square wave shape, a cube-corner shape, or the gratings may have other periodically repeating regular or irregular shapes. The gratings may be one-directional (i.e., periodic in one direction and extending in a substantially orthogonal direction) or may be two-directional having a shape that repeats in two directions.

For any of the embodiments discussed herein, the index contrast for any grating multiplied by the peak to valley height of the grating may be greater than about 100 nm, or greater than about 150 nm, or greater than about 200 nm and less than about 400 nm, or less than about 350 nm, or less than about 300 nm. For example, in some embodiments, $|n_1-n_2|$ multiplied by h is between about 100 nm and about 400 nm or between about 150 nm and about 350 nm or between about 200 nm and about 300 nm. In some embodiments, h multiplied by $|n_1-n_2|$ is in a range of about 150 nm to about 350 nm and the pitch is in a range of about 2 microns to about 50 microns. Such grating geometries have been found to be effective in reducing sparkle without significantly degrading perceived image resolution.

Interface 137 between the second layer 120 and the third layer 130 may be unstructured (i.e., substantially flat) as illustrated in FIG. 1 or may be structured to provide an optical effect as discussed further elsewhere.

Optical adhesive 100 can be used to attach a cover glass, for example, to a display panel. In some embodiments, interface 135 and/or interface 137 are configured to provide a diffraction effect that reduces sparkle when optical adhesive 100 is attached to a cover glass and/or a display panel.

First layer 110 includes outer major surface 140 and third layer 130 includes outer major surface 145. In some embodiments, optical adhesive 100 is provided with a first release film immediately adjacent outer major surface 140 and/or a second release film immediately adjacent outer major surface 145. The first and second release films are sacrificial films that are intended to be removed prior to use of optical adhesive 100 in a display. A release film having a release surface may be included with any of the multilayer optical adhesives of the present description with the release surface immediately adjacent an outer major surface of a viscoelastic or elastomeric adhesive layer. The release film may provide a structure so that when the release film is removed, the structured outer surface of the viscoelastic or elastomeric adhesive layer is structured to provide channels for air bleed. In some embodiments, the viscoelastic or elastomeric adhesive layer can wet out a surface in order to eliminate the channels after the layer is attached to the surface. Suitable adhesives and air bleed structures are described, for example, in U.S. Pat. App. Pub. No. 2007/0212535 (Sherman et al.).

In any of the embodiments described herein a layer disposed between two viscoelastic or elastomeric adhesive layers may have a land thickness (i.e., the thickness excluding the heights of the structures) of less than 25 microns, or less than 20 microns, or less than 15 microns, or less than 10 microns. In some embodiments, the land thickness is greater than about 1 micron, or greater than about 3 microns or greater than about 5 microns. Using a layer having a land thickness less than 25 microns could not be achieved with conventional techniques when the layer is a carrier film, since a carrier film typically has a thickness 50 microns or greater so that the carrier film is self-supporting. Thus the multilayer optical adhesives of the present description provide a structured article with a low thickness and with no optical artifacts associated with a carrier film, which cannot be achieved using conventional techniques.

In any of the embodiments described herein, each layer of the multilayer optical adhesive may be substantially transmissive. For example, first layer 110 of optical adhesive 100 may be a first viscoelastic or elastomeric adhesive layer, second layer 120 may be a first crosslinked or soluble resin layer and third layer 130 may be the second viscoelastic or elastomeric adhesive layer, and each of the first viscoelastic or elastomeric adhesive layer, the first crosslinked or soluble resin layer and the second viscoelastic or elastomeric adhesive layer may be substantially transmissive.

As used herein, a "substantially transmissive" layer is a layer having the material property that substantially all visible light propagating through the layer is either transmitted through the layer or reflected at an interface at a boundary of the layer. In some embodiments, more than 95% or more than 97% of light having a wavelength of 550 nm and incident on the layer is transmitted through the layer or reflected from an interface at a boundary of the layer.

Figure 2A:
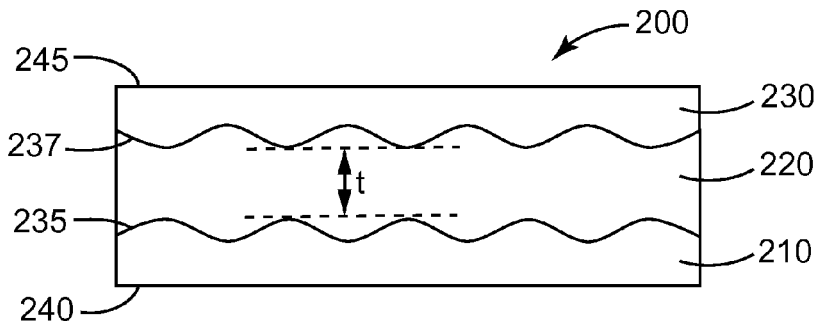
FIG. 2A is a cross-sectional view of a multilayer optical adhesive.

An embodiment in which two structured interfaces are present in a multilayer optical adhesive of the present description is illustrated in FIG. 2A. Optical adhesive 200 includes a first layer 210, a second layer 220 immediately adjacent first layer 210, and a third layer 230 immediately adjacent second layer 220 opposite first layer 210. In some embodiments, first layer 210 is a first viscoelastic or elastomeric adhesive layer, second layer 220 is a crosslinked or soluble resin layer and third layer 230 is a second viscoelastic or elastomeric adhesive layer.

First layer 210 includes outer major surface 240 and third layer 230 includes outer major surface 245. In some embodiments, optical adhesive 200 is provided with a first release film immediately adjacent outer major surface 240 and/or a second release film immediately adjacent outer major surface 245.

Optical adhesive 200 includes a structured first interface 235 between first layer 210 and second layer 220 and a structured second interface 237 between second layer 220 and third layer 230. In some embodiments, first interface 235 includes a first grating and second interface 237 includes a second grating. In some embodiments, the first grating extends in a first direction and the second grating extends in a second direction different from the first direction.

Second layer 220 has a land thickness (i.e., a thickness excluding the heights of the structures) oft. In some embodiments, the land thickness t is less than 25 microns (or less than 20 microns or less than 15 microns or less than 10 microns). In some embodiments, the land thickness t is greater than about 1 micron, or greater than about 3 microns or greater than about 5 microns.

Figure 2B:
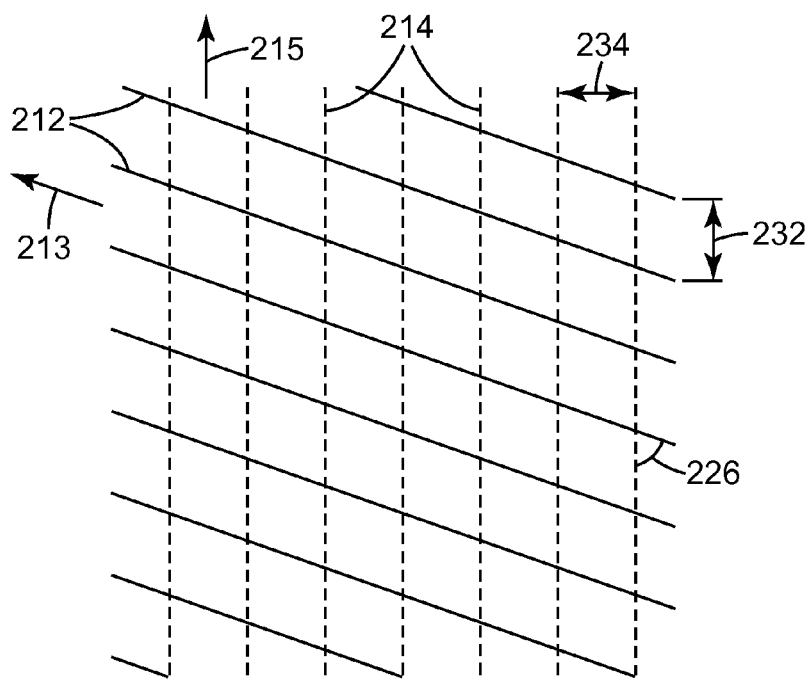
FIG. 2B is a schematic top perspective view of a multilayer optical adhesive.

FIG. 2B shows a schematic top view of an optical adhesive having a first grating represented by element 212 extending in first direction 213 and a second grating represented by element 214 extending in a second direction 215 with angle 226 between first direction 213 and second direction 215. The first grating represented by element 212 has a first pitch 232 and the second grating represented by element 214 has a second pitch 234. In many embodiments, second direction 215 is different from first direction 213. In some embodiments, angle 226 is greater than 0 degrees, or greater than about 5 degrees, or greater than about 10 degrees, or greater than about 20 degrees and less than or equal to 90 degrees. It will be understood than an angle greater than 90 degrees is equivalent to a complement angle less than 90 degrees. In some embodiments, first direction 213 and second direction 215 are substantially orthogonal. In some embodiments the first pitch 232 and the second pitch 234 are about equal. In other embodiments, the first pitch 232 and the second pitch 234 are different.

Figure 3:
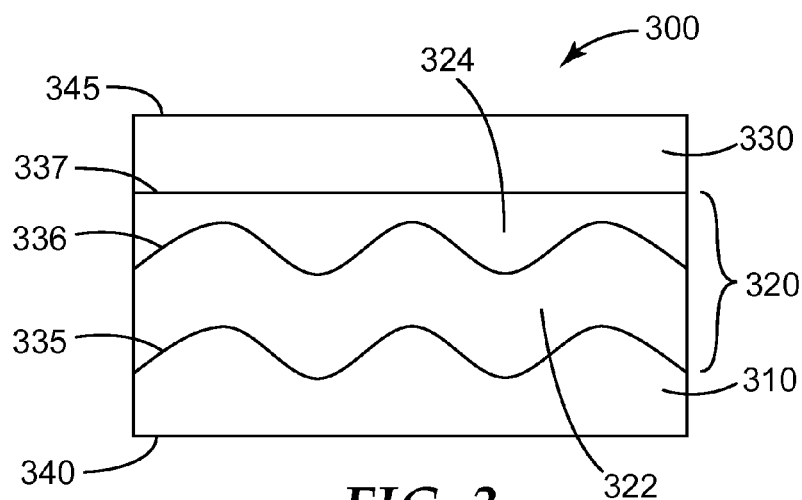
FIG. 3 is a cross-sectional view of a multilayer optical adhesive.

Another embodiment in which two structured interfaces are present in a multilayer optical adhesive of the present description is illustrated in FIG. 3. Optical adhesive 300 includes a first layer 310, a second layer 320 immediately adjacent first layer 310, and a third layer 330 immediately adjacent second layer 320 opposite first layer 310. First layer 310 is a first viscoelastic or elastomeric adhesive layer, second layer 320 is a crosslinked or soluble resin layer and third layer 330 is a second viscoelastic or elastomeric adhesive layer. As used herein, a crosslinked or soluble resin layer may consist of one or more sublayers where each sublayer is a crosslinked or soluble resin layer and does not include any sublayer that is not a crosslinked or soluble resin layer. Second layer 320 includes first sublayer 322 immediately adjacent first layer 310, and second sublayer 324 immediately adjacent the first sublayer 322 and immediately adjacent third layer 330. Optical adhesive 300 includes first interface 335 between first layer 310 and first sublayer 322, second interface 336 between first sublayer 322 and second sublayer 324, and third interface 337 between second sublayer 324 and third layer 330. In the illustrated embodiment, first interface 335 and second interface 336 are structured and third interface 337 is unstructured. In other embodiments, any one, two or all of the first, second and third interfaces 335, 336 and 337 are structured.

First layer 310 includes outer major surface 340 and third layer 330 includes outer major surface 345. In some embodiments, optical adhesive 300 is provided with a first release film immediately adjacent outer major surface 340 and/or a second release film immediately adjacent outer major surface 345.

Figure 4:
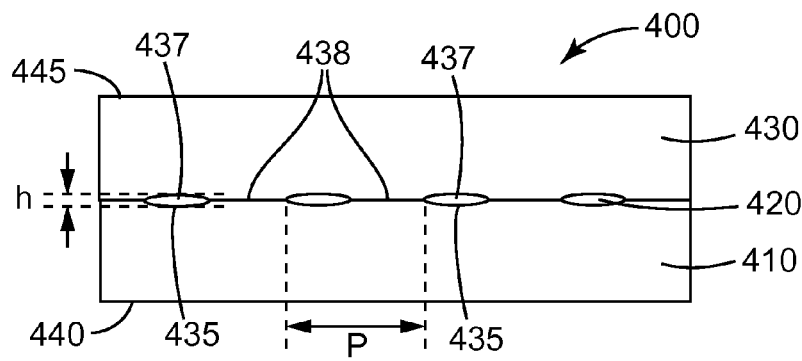
FIG. 4 is a cross-sectional view of a multilayer optical adhesive.

In some embodiments, one or more layers of a multilayer optical adhesive are discontinuous as illustrated in FIG. 4. Optical adhesive 400 includes a first layer 410, a second layer 420 immediately adjacent first layer 410, and a third layer 430 immediately adjacent second layer 420 opposite first layer 410. Third layer 430 is in contact with first layer 410. In some embodiments, first layer 410 is a first viscoelastic or elastomeric adhesive layer, second layer 420 is a crosslinked or soluble resin layer and third layer 430 is a second viscoelastic or elastomeric adhesive layer. Second layer 420 is discontinuous. Optical adhesive 400 includes a first major surface 440, a second major surface 445, a first interface 435 between the first layer 410 and the second layer 420, a second interface 437 between the second layer 420 and the third layer 430, and a third interface 438 between the first layer 410 and the third layer 430.

In some embodiments, the first, second and third interfaces, 435, 437, and 438, comprise a grating that diffracts at least a portion of a light incident on a major surface (440 or 445) of the optical adhesive. The grating has a pitch P and a peak to valley height h. In some embodiments, first layer 410 has a first refractive index $n_1$, second layer 420 has a second refractive index $n_2$ different from $n_1$. In some embodiments, h multiplied by the absolute value of the refractive index between first layer 410 and second layer 420 (i.e., $h \times |n_1 - n_2|$) is in a range of about 150 nm to about 350 nm and the pitch, P, is in a range of about 2 microns to about 50 microns.

In some embodiments, third layer 430 is an additional layer that may be a viscoelastic or elastomeric adhesive layer or may be some other layer. In some embodiments, first layer 410 is a first viscoelastic or elastomeric adhesive layer, second layer 420 is a discontinuous layer and first layer 410 is adhered to a surface of a layer in a display with second layer 420 facing the surface. Third layer 430 is then the layer in the display, which may, for example, be a glass layer. In some embodiments, third layer 430 is a release liner with a release surface facing first layer 410.

Second layer 420 may be applied to first layer 410 by ink jet printing, for example. In some embodiments, optical adhesive 400 is made by providing first layer 410 with a structured surface. A solvent-borne resin may then be coated onto the structured surface and the solvent may then be evaporated producing in a partial filling of the structured surface which results in a discontinuous second layer 420. Third layer 430 may then be coated over the discontinuous second layer 420 and over the part of the structured surface in first layer 410 not covered by the discontinuous second layer 420. In some embodiments, second layer 420 is formed by printing a material onto an unstructured surface of first layer 410. The material may be a resin that diffuses into the surface of first layer 410 forming a second layer 420 that is discontinuous and located near the major surface of first layer 410 opposite first major surface 440.

Figure 5:
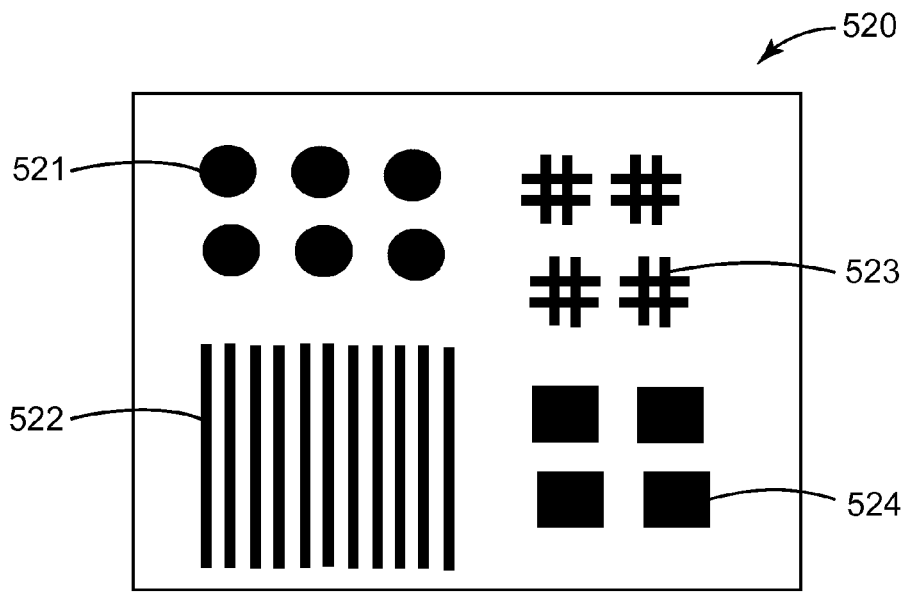
FIG. 5 is a schematic top perspective view of a discontinuous layer.

Second layer 420 may include a plurality of discrete objects in a pattern. The discrete objects may be dots, cross-hatches, ribs, pillow-shaped objects (deformed rectangular parallelepiped objects with tops bowed outward) or combinations thereof. FIG. 5 shows a cross-section view of a discontinuous second layer showing dots 521, ribs 522, cross-hatches 523 and rectangular parallelepipeds 524 which, in some embodiments, may have a domed outer surface.

Figure 6:
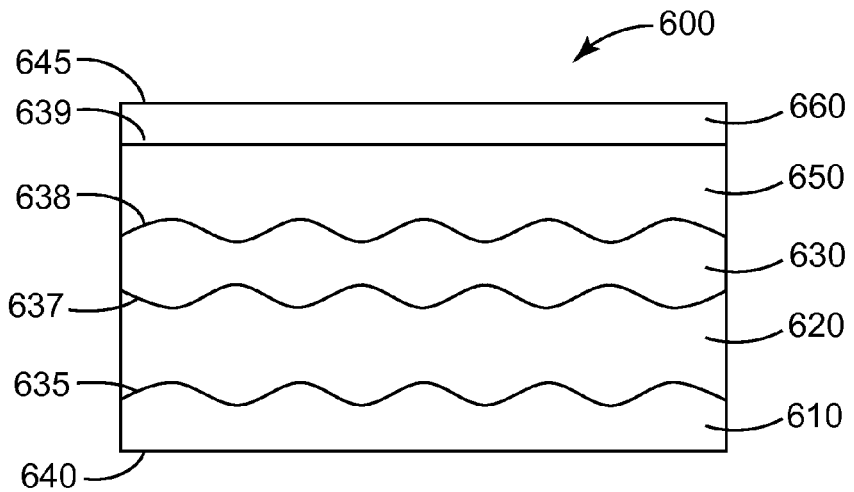
FIG. 6 is a cross-sectional view of a multilayer optical adhesive.

Multilayer optical adhesives according to the present description may include more than three layers as illustrated in FIG. 6. Optical adhesive 600 includes a first layer 610, a second layer 620 immediately adjacent first layer 610, a third layer 630 immediately adjacent second layer 620 opposite first layer 610, a fourth layer 650 immediately adjacent third layer 630 opposite second layer 620, and a fifth layer 660 immediately adjacent fourth layer 650 opposite third layer 630. In some embodiments, first layer 610 is a first viscoelastic or elastomeric adhesive layer, second layer 620 is a first crosslinked or soluble resin layer, third layer 630 is a second viscoelastic or elastomeric adhesive layer, fourth layer 650 is a second crosslinked or soluble resin layer, and fifth layer 660 is a third viscoelastic or elastomeric adhesive layer. Optical adhesive 600 includes first interface 635 between first layer 610 and second layer 620, second interface 637 between second layer 620 and third layer 630, third interface 638 between third layer 630 and fourth layer 650, and fourth interface 639 between fourth layer 650 and fifth layer 660. Optical adhesive 600 can be made by adhering an outer major surface 245 of a first optical adhesive 200 of FIG. 2 to an outer major surface 240 of a second optical adhesive 200. Optical adhesive 600 can also be made layer by layer using the processes described elsewhere.

In some embodiments, at least two of the first, second, third and fourth interfaces 635, 637, 638, and 639 are structured. In some embodiments, any one, two, three or all of the first, second, third and fourth interfaces 635, 637, 638, and 639 are structured. In some embodiments, the first, second, third and fourth interfaces 635, 637, 638, and 639 include a first grating extending in a first direction and a second grating extending in a second direction different from the first direction.

First layer 610 includes outer major surface 640 and third layer 630 includes outer major surface 645. In some embodiments, optical adhesive 600 is provided with a first release film immediately adjacent outer major surface 640 and/or a second release film immediately adjacent outer major surface 645.

According to the present description, it has been discovered that multilayer optical adhesives can be constructed from a first viscoelastic or elastomeric adhesive layer and a second viscoelastic or elastomeric adhesive layer where an interface between the two adhesives is structured and the interface is stable over time against heat and mechanical deformation.

Figure 7:
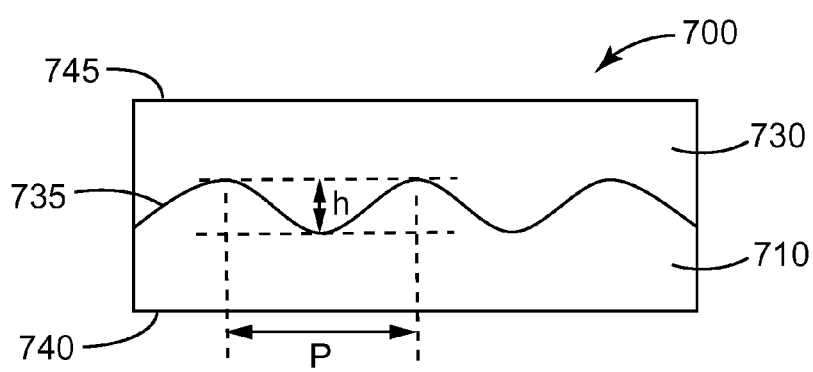
FIG. 7 is a cross-sectional view of a multilayer optical adhesive.

A multilayer optical adhesive according to the present description is shown in FIG. 7. Optical adhesive 700 includes a first layer 710 and a second layer 730 immediately adjacent first layer 710. First layer 710 is a first viscoelastic or elastomeric adhesive layer having a first refractive index $n_1$ and second layer 730 is a second viscoelastic or elastomeric adhesive layer having a second refractive index $n_2$ different from $n_1$. Optical adhesive 700 includes interface 735 which may include a substantially continuous grating. The grating may have a peak to valley height of h and a pitch of P. The peak to valley height, h, multiplied by the refractive index contrast across the grating, $|n_1-n_2|$, may be in the range of about 150 nm to about 350 nm and the pitch may be in a range of about 2 microns to about 50 microns. As discussed elsewhere, this range has been found to give good anti-sparkle properties.

First layer 710 includes outer major surface 740 and third layer 730 includes outer major surface 745. In some embodiments, optical adhesive 700 is provided with a first release film having a first release surface immediately adjacent outer major surface 740 and/or a second release film having a second release surface immediately adjacent outer major surface 745.

In some embodiments of the multilayer optical adhesives of the present description, a plurality of particles or beads providing a controlled diffusion of light may be added to one or more of the layers. In embodiments where the multilayer optical adhesive is used for sparkle reduction, such beads can cause a pixel image to spread over an area larger than the pixel size when viewed through the optical adhesive and this can help reduce sparkle. In addition to reducing sparkle, incorporating a plurality of particles or beads can reduce iridescence that may occur. When a multilayer optical adhesive having a grating is included in a display, iridescence due to the frequency dependence of reflection of ambient light from the optical adhesive can sometimes be observed. An anti-glare layer can significantly reduce such iridescence, but the iridescence may be objectionable in displays not incorporating an anti-glare layer. Incorporating particles into the multilayer optical adhesive allows the iridescence to be reduced or substantially eliminated. Particles may be incorporated into any of the layers of any of the multilayer optical adhesives described herein. The particles may be incorporated into a layer immediately adjacent a grating or the particles may be incorporated into a separate additional layer disposed proximate the grating layers. The separate additional layer may be a film with a substantially unstructured surface.

It has been found that particle sizes (i.e., mean diameters) in the range of about 0.5 microns to about 30 microns can be effective in producing the desired degree of spreading the pixel image and/or in producing the desired reduction in iridescence. As used herein, mean diameter refers to the number averaged or un-weighted mean unless indicated differently. In some embodiments, the mean diameter of the particles is greater than about 0.5 microns, or greater than about 1 micron or greater than about 2 microns and the mean diameter of the particles is less than about 30 microns, or less than about 20 microns or less than about 10 microns.

The absolute value of the refractive index difference between the particles and the medium in which they are located is herein denoted $|\Delta n|$. It has been found that $|\Delta n|$ in the range of about 0.001 to about 0.1 can be effective in producing the desired degree of spreading of a pixel image and/or in producing the desired reduction in iridescence. In some embodiments, $|\Delta n|$ is greater than about 0.001 or greater than about 0.003 and less than about 0.1 or less than about 0.05 or less than about 0.01. In some embodiments, $|\Delta n|$ is in a range of about 0.003 to about 0.007. For example, PMMA beads in CEF22 optically clear adhesive (available from 3M Company, St. Paul) gives a $|\Delta n|$ of about 0.005 at 532 nm (and about 0.004 at 405 nm and about 0.003 at 632 nm). The particles can be any particles having a size and refractive index in the desired range. The particles can have a spherical, ellipsoidal, irregular or other shape. Glass beads or polymeric beads may be used.

In some embodiments, the particles are substantially monodispersed. Substantially monodispersed particles may have a distribution of particle diameters such that 90 percent or more or 95 percent or more of the particles have a diameter within 5 percent or within 10 percent of the mean particle diameter. Substantially monodispersed particles may have a distribution of particle diameters having a coefficient of variation (standard deviation divided by mean times 100 percent) of less than about 10 percent, less than about 5 percent, or less than about 4 percent. Suitable substantially monodispersed particles include monodisperse PMMA microspheres e from Microbeads AS (Skedsmokorset, Norway) or monodisperse PMMA microspheres from EPRUI Nanoparticles & Microspheres Co. Ltd. (Nanjing China) having a coefficient of variation below about 3.5 percent.

It has been found that using particles at a number density between about $10^4$ mm$^{-3}$ and about $10^8$ mm$^{-3}$ can be effective in producing a desired degree of spreading a pixel image and/or in producing a desired reduction in iridescence. Typically a lower number density is useful when a large particle size is used and a larger number density is useful when a smaller particle size is used. In some embodiments, the number density is greater than $10^4$ mm$^{-3}$ or $10^5$ mm$^{-3}$ and less than $10^8$ mm$^{-3}$ or $10^7$ mm$^{-3}$.

Figure 8A:
FIGS. 8A-8G illustrate a process of making a multilayer optical adhesive.
Figure 8B:
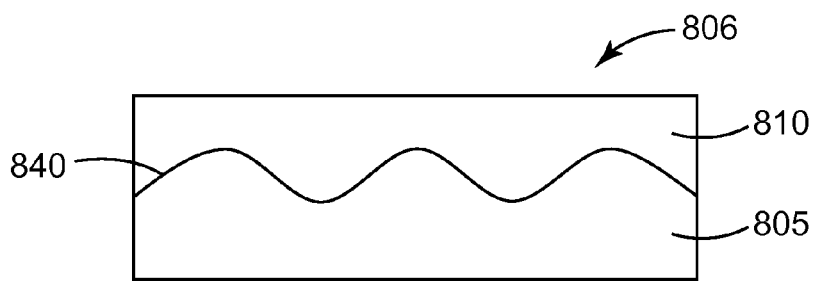
Figure 8C:
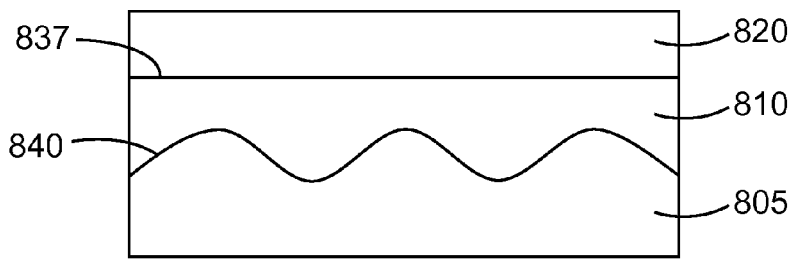
Figure 8D:
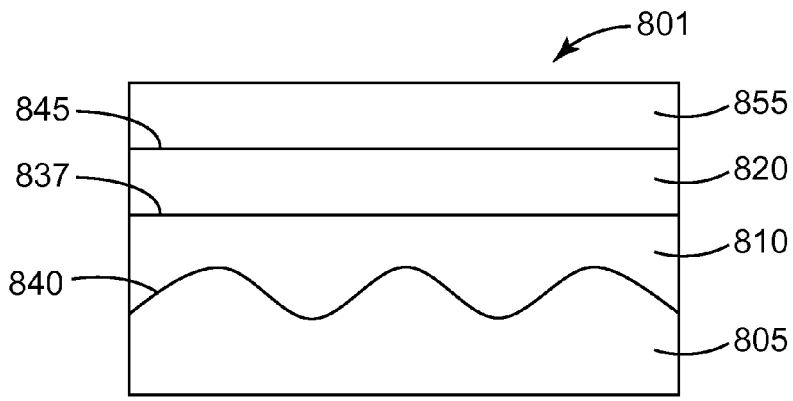

A method of making multilayer optical adhesives according the present description is illustrated in FIGS. 8A-8G. FIG. 8A shows a first release tool 805 having a structured first release surface 840. As used herein, a release tool may be a release film. For example, as described in greater detail elsewhere, a structure can be made on a film and the surface of the structure can be release treated to form a structured release film. First release tool 805 is coated with a first material on structured first release surface 840 forming first layer 810 on first release tool 805 thereby resulting in coated release tool 806 as illustrated in FIG. 8B. In some embodiments, first layer 810 is substantially continuous. In other embodiments, first layer 810 may be discontinuous. As described elsewhere, a discontinuous layer can be applied by ink jet printing or by using solvent coating techniques. In the next process step, a second material is applied onto the first material as illustrated in FIG. 8C. This forms a second layer 820 immediately adjacent the first layer 810 opposite the first release tool 805. An interface 837 is formed between first layer 810 and second layer 820. A second release tool 855 is applied to second layer 820 to form article 801 as illustrated in FIG. 8D. Second release tool 855 is immediately adjacent the second material opposite the first material with second release surface 845 facing the second material. An alternative to the steps illustrated in FIGS. 8C and 8D is to dispose the second material on the second release surface 845 of second release tool 855. The coated release tool is then applied to the first material giving article 801. In some embodiments, at least one of first layer 810 and second layer 820 is a viscoelastic or elastomeric adhesive so that article 801 is an optical adhesive which can be adhered to a surface after removing release tool 805 or 855.

In some embodiments, the first material is a first coatable resin, which may be a curable resin or a solvent-borne resin. In some embodiments, the first material is a curable resin in which case a curing step may be applied to cure the resin resulting in a crosslinked resin layer. The curing step may be applied before or after second layer 820 and second release tool 855 are applied. In some embodiments, the first material is a solvent-borne soluble resin in which case a solvent evaporation step may be applied to form a hardened soluble resin layer. The solvent evaporation step may be applied before second layer 820 is applied.

In some embodiments, the second material is a viscoelastic or elastomeric adhesive and the first material is a hardcoat resin. That is, a resin that when cured is hard enough to provide adequate pencil hardness or abrasion resistance in applications where the material can be an outer layer. For example, the cured hardcoat resin may provide a pencil hardness greater than HB or greater than H. In this case, article 801 can be used as an anti-sparkle optical adhesive, for example, by removing second release tool 855 exposing the viscoelastic or elastomeric adhesive layer (second layer 820) which can then be attached to a display surface. First release tool 805 can be removed exposing a structured surface of the hardcoat layer (first layer 810). In some embodiments where article 801 is used in display applications, release tools 805 and 855 are sacrificial layers that are removed before article 801 is used in the display.

Figure 8E:
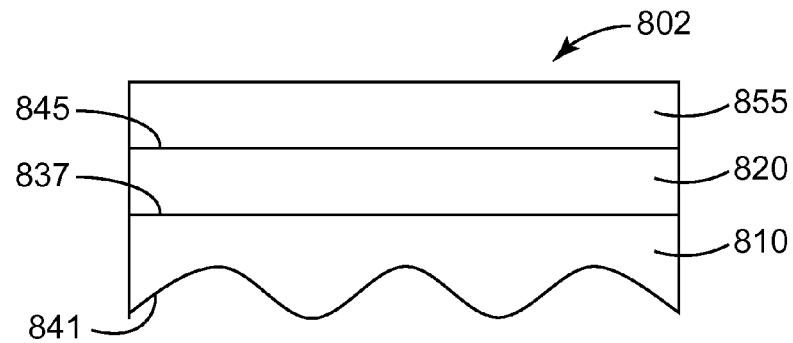
Figure 8F:
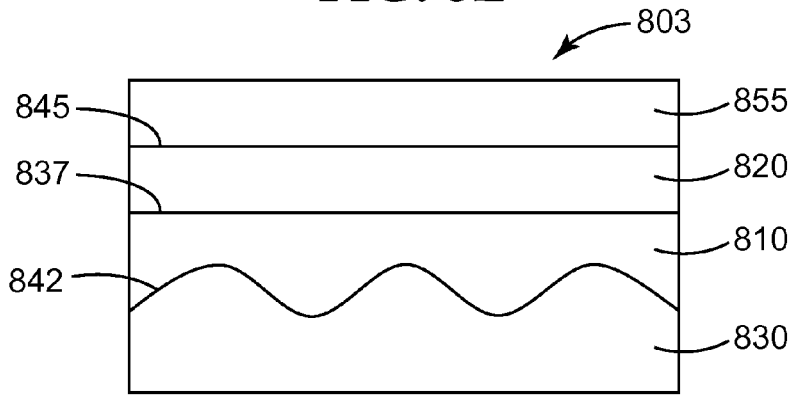
Figure 8G:
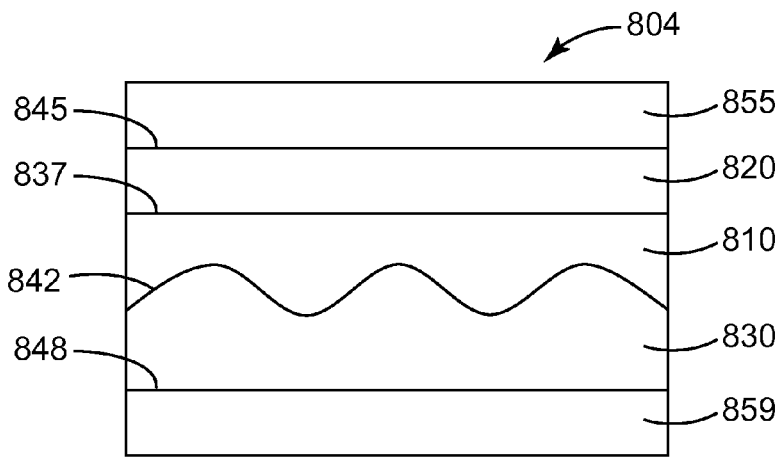

Article 801 can also be further processed to add additional layers as illustrated in FIGS. 8E-8G. First release tool 805 is removed thereby exposing structured major surface 841 of first layer 810 resulting in article 802 shown in FIG. 8E. A third material is then applied onto structured major surface 841 forming article 803 having third layer 830 as shown in FIG. 8F. Interface 842 is formed between first layer 810 and third layer 830. In some embodiments, a third release tool 859 is then applied to third layer 830 with the third release surface 848 of the third release tool 859 facing third layer 830 forming article 804 as shown in FIG. 8G. An alternative to the steps shown in FIGS. 8F-8G is to coat the third material onto a third release surface of the third release tool 859 thereby forming a coated release tool and then applying the coated release tool onto structured major surface 841 with the third material facing structured major surface 841. In many embodiments, at least one of second layer 820 and third layer 830 is a viscoelastic or elastomeric adhesive layer so that article 804 is an optical adhesive which can be adhered to a surface after removing release tool 859 or 855. In some embodiments, the first material is a first viscoelastic optically clear adhesive and the third material is a second viscoelastic optically clear adhesive which may be the same or different from the first material. In some embodiments, the third material is a second coatable resin, which may be a curable resin or a solvent-borne resin.

Release tools 855 and 859 may be sacrificial layers, such as release films, that are removed before article 804 is used as an optical adhesive in display or other applications. In some embodiments, the second and third materials are the same or different viscoelastic or elastomeric adhesives.

In some embodiments, one or both of the release tools 855 and 859 are structured so that surfaces 845 and/or 848 are structured surfaces and so that the process results in an optical adhesive having two or three structured surfaces. In this case, the process can be repeated by removing a structured release liner thereby exposing a structured surface and then applying a fourth material the exposed structured surface. Such a process can be used to make a multilayered article such optical adhesive 600 shown in FIG. 6, for example.

In some embodiments, any or all of the first, second and third release tools may be release films. In some embodiments, the steps illustrated in FIGS. 8A-8G are carried out in a continuous roll-to-roll process.

In some embodiments, each of the first layer 810, the second layer 820 and the third layer 830 are continuous layers. In some embodiments, the second layer 820 or the third layer 830 or both are discontinuous. In some embodiments, the first layer 810 is discontinuous. Any of the layers can be made discontinuous by applying the layer using ink jet printing techniques or by using standard solvent-borne coating techniques where a structure is coated and solvent is evaporated producing in a partial filling of the structure which results in a discontinuous layer. Any discontinuous layer may be include a plurality of discrete objects as described elsewhere. In some embodiments, the first material is a first viscoelastic or elastomeric adhesive and the second material is a second viscoelastic or elastomeric material which may the same or different from the first material.

Figure 9A:
FIGS. 9A-9F illustrate a process of making a multilayer optical adhesive.
Figure 9B:
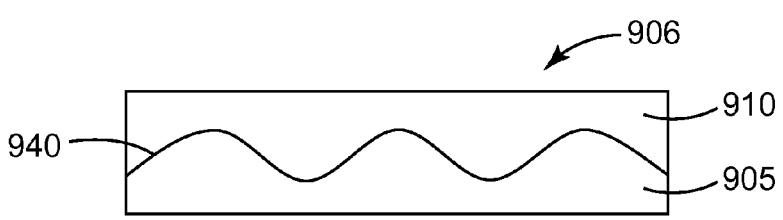
Figure 9C:
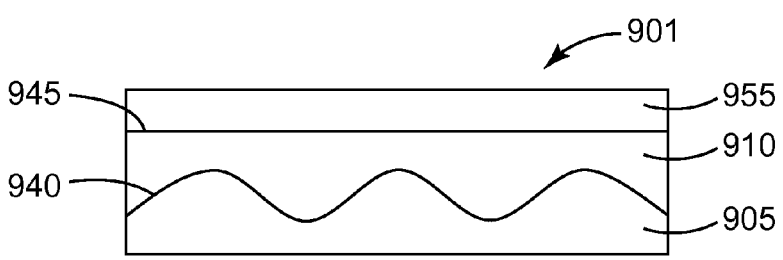

A method of making optical adhesives according the present description is illustrated in FIGS. 9A-9F. FIG. 9A shows a first release tool 905 having a structured first release surface 940. First release tool 905 is coated with a first material on structured first release surface 940 forming first layer 910 and resulting in coated release tool 906 as illustrated in FIG. 9B. In some embodiments, first layer 910 is substantially continuous. In other embodiments, first layer 910 may be a discontinuous layer as described elsewhere. In some embodiments, the first material is a coatable resin, which may be a curable resin or a solvent-borne resin. Next, a second release tool 955 is applied to first layer 910 to form article 901 as illustrated in FIG. 9C. Second release tool 955 is immediately adjacent the first material opposite the first release tool 905 with second release surface 945 facing the first material. Alternatively, the first material may be coated onto second release tool 955 and then the coated release tool applied to first release tool 905.

Figure 9D:
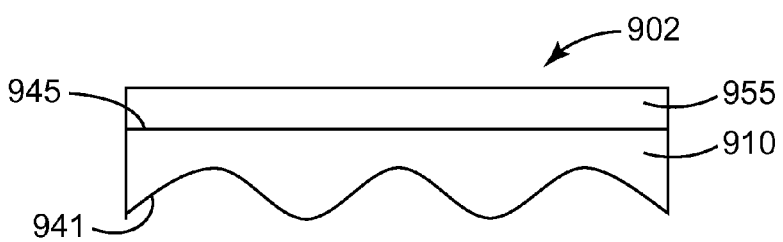
Figure 9E:
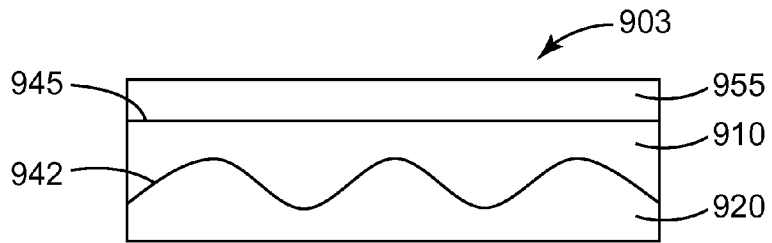
Figure 9F:
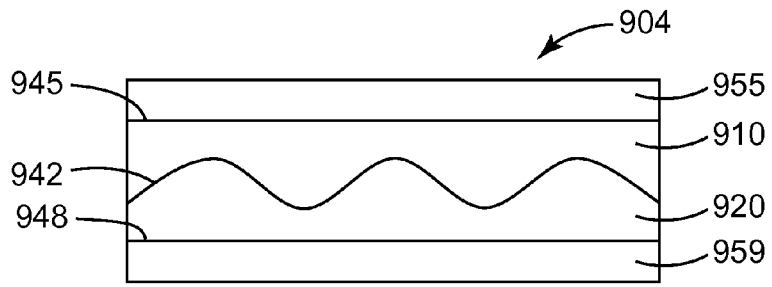

Next, first release tool 905 is removed thereby exposing structured major surface 941 of first layer 910 in the article 902 shown in FIG. 9D. A second material is then applied onto structured major surface 941 forming article 903 having second layer 920 as shown in FIG. 9E. Interface 942 is formed between first layer 910 and second layer 920. In some embodiments, a third release tool 959 is then applied to second layer 920 with the third release surface 948 of the third release tool 959 facing second layer 920 forming article 904 as shown in FIG. 9F. An alternative to the steps shown in FIGS. 9E-9F is to coat the second material onto third release surface 948 of the third release tool 959 thereby forming a coated release tool and then applying the coated release tool onto structured major surface 941 with the second material facing structured major surface 941.

In many embodiments, the first material and/or the second material are adhesives and article 904 is an optical adhesive. In some embodiments, the first material is a first viscoelastic or elastomeric adhesive and the second material is a second viscoelastic or elastomeric material different from the first material. In some embodiments, the first material is a first viscoelastic optically clear adhesive and the second material is a second viscoelastic optically clear adhesive different from the first material.

Figure 10A:
FIGS. 10A-10F illustrate a process of making a multilayer optical adhesive.
Figure 10B:
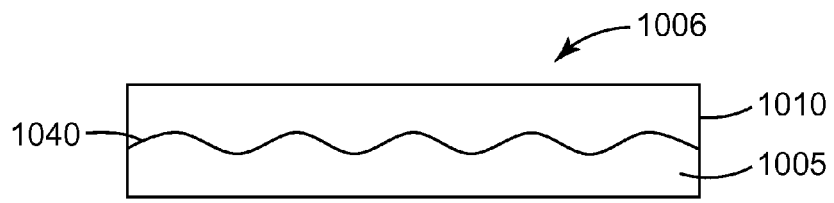
Figure 10C:
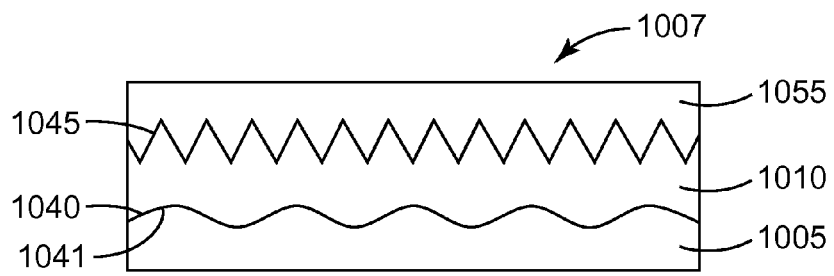
Figure 10D:
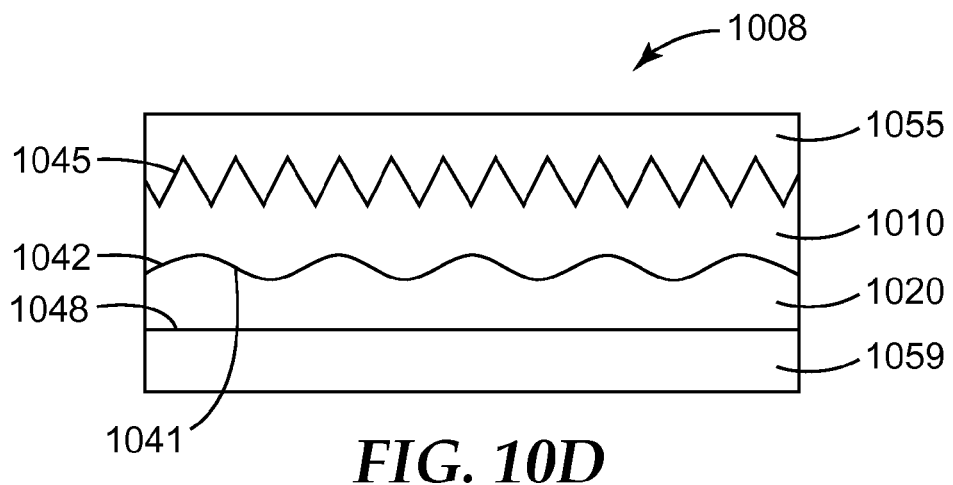

A method of making optical adhesives according to the present description is illustrated in FIGS. 10A-10F. FIG. 10A shows a first release tool 1005 having a structured first release surface 1040. First release tool 1005 is coated with a first material on structured first release surface 1040 forming first layer 1010 and resulting in coated release tool 1006 as illustrated in FIG. 10B. In some embodiments, first layer 1010 is substantially continuous. In other embodiments, first layer 1010 may be a discontinuous layer as described elsewhere. In some embodiments, the first material is a coatable resin, which may be a curable resin or a solvent-borne resin. In some embodiments, the first material is a hardcoat resin as described elsewhere. Next, a second release tool 1055 having a second release surface 1045 is applied to first layer 1010 forming article 1007 as illustrated in FIG. 10C. The first material flows or deforms to fill coat the second release surface 1045 which is a structured surface in the embodiment illustrated in FIGS. 10A-10F. First release tool 1005 is then removed exposing a structured first surface 1041 in first layer 1010. A third release tool coated with a second material is applied on the structured first surface 1041 forming a second layer 1020 which forms interface 1042 with first layer 1010 and resulting in article 1008 as illustrated in FIG. 10D. In some embodiments, second layer 1020 is a viscoelastic or elastomeric adhesive layer and article 1008 is an optical adhesive. Alternatively, a second material may be coated onto structured first surface 1041 forming second layer 1020 and interface 1042 and then third release tool 1059 may be applied onto second layer 1020 with third release surface 1048 facing second layer 1020.

Figure 10E:
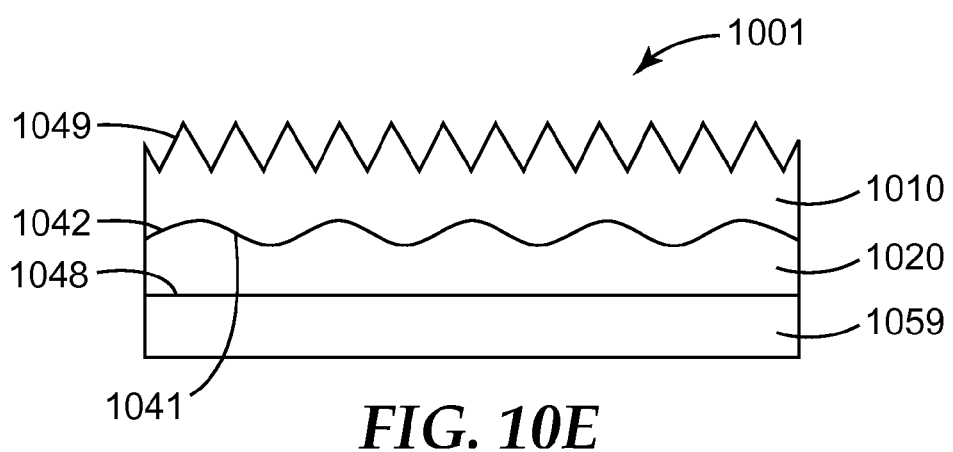
Figure 10F:
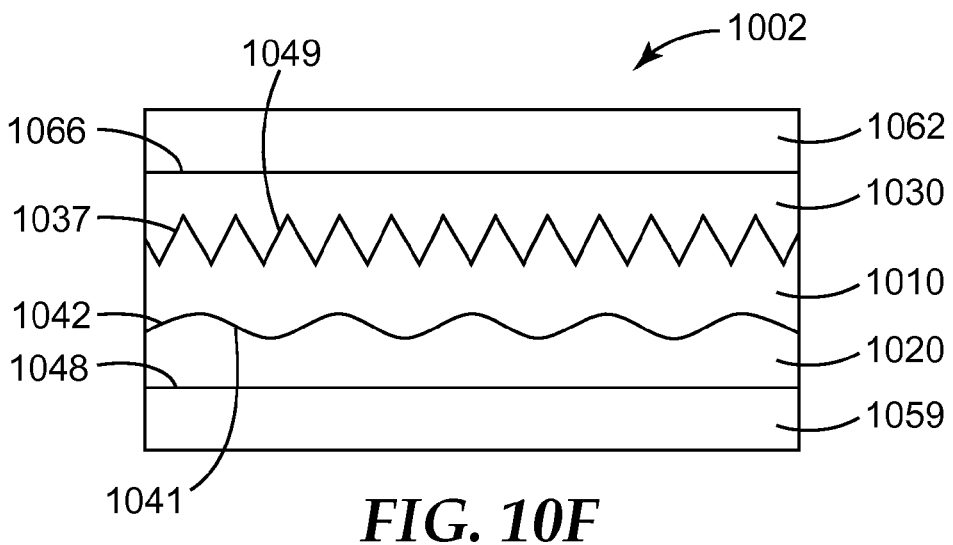

Next, second release tool 1055 is removed exposing structured second surface 1049 in first layer 1010 and producing article 1001 as illustrated in FIG. 10E. In some embodiments, second layer 1020 is a viscoelastic or elastomeric adhesive layer and article 1001 is an optical adhesive. A fourth release tool coated with a third material is applied the structured second surface 1049 forming a third layer 1030 which forms interface 1037 with first layer 1010 as illustrated in FIG. 10F, which provides a cross-sectional view of article 1002. Alternatively, a third material may be coated onto structured second surface 1049 forming third layer 1030 and interface 1037 and then fourth release tool 1062 may applied to third layer 1030 with third release surface 1066 facing third layer 1030. In some embodiments, at least one of second layer 1020 and third layer 1030 are viscoelastic or elastomeric adhesive layers so that article 1002 is an optical adhesive.

Figure 11:
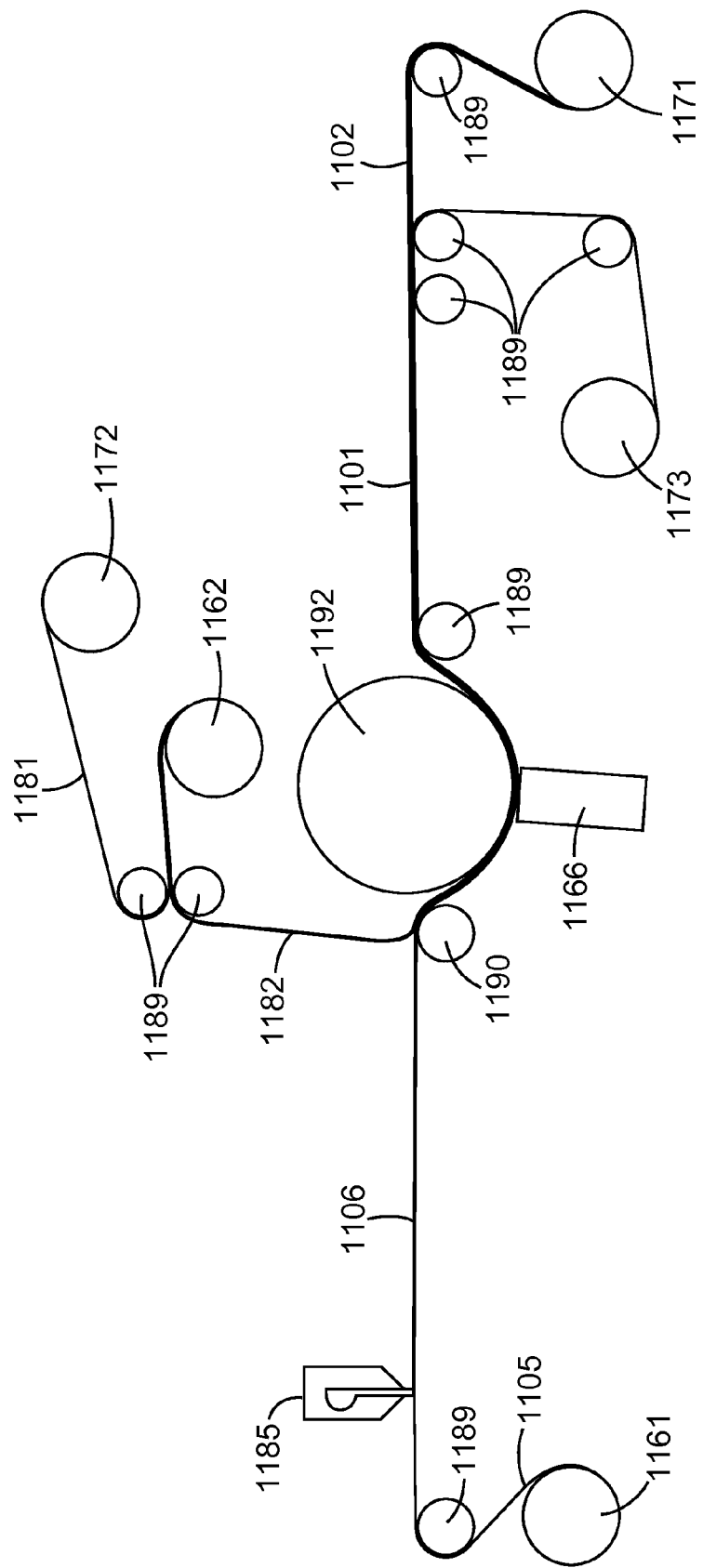
FIG. 11 illustrates a process of making a multilayer optical adhesive.

Any of the methods illustrated in FIGS. 8A-10F can be carried out in continuous roll-to-roll processes. FIG. 11 illustrates a continuous process for making article 802 of FIG. 8E, for example. Additional continuous processing steps can be included to make article 804 of FIG. 8G, for example.

The structured release tool used in the process of FIG. 11 is a structured release film 1105 which is provided on an unwind roll 1161. Structured release film is continuously unwound from unwind roll 1161 and coated at various stages described elsewhere to produce article 1101. The structured release film 1105 is removed from article 1101 to produce article 1102 which is continuously wound onto wind roll 1171. The system illustrated in FIG. 11 includes various rollers 1189 to facilitate the movement of the various films through the system.

A structured release film can be prepared, for example, by using a continuous cast and cure process to form a structured surface on a film, such as a PET film. In a continuous cast and cure process a micro-replication roll can be made using a diamond tool to cut an inverted pattern into a copper roll which can be used to make the pattern on a substrate using a continuous cast and cure process utilizing a polymerizable resin. Suitable diamond tooling is known in the art and includes the diamond tooling described in U.S. Pat. No. 7,140,812 (Bryan et al.). Continuous cast and cure processes are known in the art and are described in the following patents: U.S. Pat. No. 4,374,077 (Kerfeld); U.S. Pat. No. 4,576,850 (Martens); U.S. Pat. No. 5,175,030 (Lu et al.); U.S. Pat. No. 5,271,968 (Coyle et al.); U.S. Pat. No. 5,558,740 (Bernard et al.); and U.S. Pat. No. 5,995,690 (Kotz et al.). The resulting structure can then be treated using conventional surface treatment techniques to produce structured release film 1105. For example, a surface treatment may include an oxygen plasma treatment followed by a tetramethylsilane (TMS) plasma treatment.

Structured release film 1105 is unwound from unwind roll 1161 and coated with a first material, which may be a radiation (e.g., ultraviolet (UV)) curable resin, to produce coated release film 1106. The first material may be die coated onto the structured side of structured release film 1105 using die coater 1185.

An adhesive (for example, a viscoelastic or elastomeric adhesive) between a first release liner and a second release liner is provided on unwind roll 1162. The first release liner 1181 is removed and wound onto wind roll 1172. The exposed surface of the adhesive in the resulting adhesive-coated release liner 1182 is then applied onto coated release film 1106 and passed between nip roller 1190 and backup roll 1192. In some embodiments, the first material is a UV-curable resin and a UV curing station 1166 is provided to cure the resin as it passes by backup roll 1192. The coated release film 1106 with the adhesive and second release liner in place is multilayered article 1101. Structured release film 1105 is removed from multilayered article 1101 producing multilayered article 1102 which is wound onto wind roll 1171. The removed structured release film 1105 is wound onto wind roll 1173. Article 1102 can have the general structure as article 802 of FIG. 8E. An alternative process adds the step of applying an additional adhesive coated release liner to the exposed structured surface of article 1102. This can result in an article having the general structure of article 804 of FIG. 8G.

In another embodiment, the first material is not applied with die coater 1185 and adhesive-coated release liner 1182 is applied directly to structured release film 1105. UV curing station 1166 may be omitted in this embodiment. Article 1101 may then have the general structure of article 901 of FIG. 9C and article 1102 may then have the general structure of article 902 of FIG. 9D. The exposed structured surface of article 1102 may then be coated with an adhesive and a release liner applied resulting in an article having the general structure of article 904 of FIG. 9F.

In some embodiments, article 1008 of FIG. 10D is made using a process similar to that illustrated in FIG. 11 except that unwind roll 1162 is replaced with an unwind roll containing a second structured release film. After structured release film 1105 (corresponding to first release tool 1005) is removed, a coating may be applied to the exposed structured surface using a die coater, for example, and a second release film applied to the coating resulting in article 1008. Similarly, the second structured release film can be removed and an additional coating and release film can be applied to produce article 1102 of FIG. 10F.

EXAMPLES

All parts, percentages, ratios, etc. are by weight, unless noted otherwise. Solvents and other reagents used are available from Sigma-Aldrich Chemical Company; Milwaukee, Wis. unless specified differently.

Materials

| Abbreviation | Description |
|---|---|
| PET Film | 5 mil (127 micron), 1 side primed PET film, commercially available from 3M Company, St. Paul, MN |
| RF Release Liner | Release liner, commercially available from SKC Haus, Kangnam-gu, Seoul stated as "RF02N" |
| ADH1 | Optically clear adhesive, commercially available from 3M Company St. Paul, MN as "8146-4" having a refractive index of 1.47 |
| ADH2 | Optically clear adhesive having a refractive index of 1.47 prepared as described in U.S. Pat. No. 7,927,703 (Xia et al.). |
| ADH3 | High refractive index adhesive comprising, iso-octyl acrylate, acrylic acid 6-(biphenyl-2-yloxy)-ethyl ester, (40/60) and photoinitiator as described in Example 34 in U.S. Pat. No. 8,378,046 (Determan), refractive index of 1.55 |
| Microbeads | Monodispersed spherical particles (having 10 micron diameters and a refractive index of 1.50), commercially available from Microbeads AS, Skedsmokorset, Norway as "CA10" Spheromers. |
| Photomer 6210 | Aliphatic urethane diacrylate available from Sartomer Americas, Exton, PA |
| HDDA | 1,6-hexanediol diacrylate available from Sigma-Aldrich Chemical Company, Milwaukee, WI |
| TMPTA | Trimethylolpropane triacrylate available from Sigma-Aldrich Chemical Company, Milwaukee, WI |
| TPO | 2,4,6-trimethylbenzoyl-diphenyl-phosphineoxide available from Sigma-Aldrich Chemical Company, Milwaukee, WI |
| CN-120 | Epoxy acrylate available from Sartomer Americas, Exton, PA |
| PEA | Phenoxyethyl acrylate available from Sigma-Aldrich Chemical Company, Milwaukee, WI |
| DAROCUR 1173 | Photoinitiator available from BASF, Ludwigshafen, Germany |
| R1 | Polymerizable resin composition having a refractive index of 1.47, prepared by mixing Photomer 6210, HDDA, TMPTA, TPO at a weight ratio of 60/20/20/0.5 |
| R2 | Polymerizable resin composition having a refractive index 1.57 prepared by mixing CN-120, PEA, DAROCUR 1173, TPO at a weight ratio of 75/25/0.25/0.1 |
| PRIPOL | PRIPOL 1006 available from Croda USA, New Castle, DE. 13 percent solids in IPA/Toluene. |

Release Tool

A release treated film replicate was made from a precision cylindrical tool as follows. The cylindrical tool was a modified diamond-turned metallic tool. Patterns were cut into the copper surface of the tool using a precision diamond turning machine. The resulting copper cylinders with precision cut features were nickel plated and release treated to promote the release of cured resin during the microreplication process. The structure cut into the copper tool was a sine wave with the dimensions of a 12 micron pitch and 2.5 micron peak to valley height. A film replicate was then made from the precision cylindrical tool. An acrylate resin comprising acrylate monomers and a photoinitiator was cast into a PET Film and then cured against the precision cylindrical tool using ultraviolet light. The surface of the resulting structured film was coated with a silane release agent (tetramethylsilane) using a plasma-enhanced chemical vapor deposition (PECVD) process to produce a release treated film replicate suitable for use as a release tool in making multilayer optical adhesives.

Example 1

The release treated film replicate, described under "Release Tool", was used as a base layer for the following coating. R1 was dripped onto the structured side of the film replicate. ADH1 is an optically clear roll adhesive with 2 release liners on opposing sides. One release liner was removed and the exposed adhesive was placed in contact with the uncured resin on the top side of the coating. The entire construction was ran through a nip style laminator (Professional Laminator system, model PL1200HP) at speed setting of 3. The entire construction was cured under high intensity bulbs (Fusion UV-Light hammer 6 with H bulbs, RPC industries Model Number I6P1/LH) at 30 ft/min (9.1 m/min).

The remaining release liner and the release treated film replicate were removed and the resulting adhesive was inspected under an optical microscope. The structured interface was observed to have been replicated with high fidelity and no visual artifacts (such as a high haze or low clarity) were observed. A green laser pointer was used to shine a laser light having a wavelength of 532 nm through the adhesive. A linear diffraction pattern was observed.

Example 2

The construction made in Example 1, was further processed as follows. The release treated structure was removed from the cured resin. The structured surface was now open to the air and it was overcoated with an optically clear adhesive ADH2. The adhesive was coated with a benchtop knife coater with a gap set of 5 mils (127 microns). After it was hand pulled through the knife coater it was placed in a 70° C. oven for 5 min. An RF Release Liner was laminated to the final construction, after the construction had been removed from the oven, with a hand roller using light pressure.

The release liners were removed and the resulting adhesive was inspected under an optical microscope. The structured interface was observed to have been replicated with high fidelity and no visual artifacts (such as a high haze or low clarity) were observed. A green laser pointer was used to shine a laser light having a wavelength of 532 nm through the adhesive. A linear diffraction pattern was observed with three relatively high intensity peaks observed. Additional much lower intensity peaks were also observed.

Example 3

A release tool was made as described in "Release Tool" except that the sinusoidal pattern was replaced with a turning film (linear prisms) structure. A multilayer optical adhesive was made using this tool using the process described as in Examples 1 and 2. The resulting optical adhesive had a structured interface having linear prisms with an apex angle of 70 degrees and a peak to valley height of 35 microns. The resulting adhesive was inspected under an optical microscope. The structured interface was observed to have been replicated with high fidelity and no visual artifacts (such as a high haze or low clarity) were observed.

Example 4

A sample was made as in Example 2 except that the optically clear adhesive ADH2 contained 35% by weight of Microbeads. After removing the release liners the resulting adhesive was inspected under an optical microscope. The structured interface was observed to have been replicated with high fidelity and no visual artifacts (such as a high haze or low clarity) were observed. A green laser pointer was used to shine a laser light having a wavelength of 532 nm through the adhesive. A linear diffraction pattern was observed with three relatively high intensity peaks observed. Additional much lower intensity peaks were also observed.

Example 5

ADH2 was coated onto the release treated film replicate described under "Release Tool" and placed in an oven at 70° C. for 5 min, to evaporate the solvent. PET Film was laminated to the adhesive using a hand roller and used to remove the adhesive from the release treated film replicate. A higher refractive index adhesive, ADH3 was coated with a bench top knife coater over the top of the exposed structure. The material was pulled through the knife coater by hand and the gap had been set to 4 mils (102 microns). The material was placed in an oven at 70° C. for 5 min. An RF Release Liner was laminated to the final construction, after the construction had been removed from the oven, with a hand roller using light pressure.

After removing the release liners the resulting adhesive was inspected under an optical microscope. The structured interface was observed to have been replicated with high fidelity and no visual artifacts (such as a high haze or low clarity) were observed. A green laser pointer was used to shine a laser light having a wavelength of 532 nm through the adhesive. A linear diffraction pattern was observed with three relatively high intensity peaks observed. Additional much lower intensity peaks were also observed.

Example 6

The starting construction was the same construction that was made in Example 1. The release treated film replicate was removed from the construction exposing the cured structures. R1 was dripped onto the exposed structures. A release treated film replicate as described in "Release Tool" was laid 30 degrees to the previous structure orientation with the structure side in contact with the uncured resin. The entire construction was ran through a nip style laminator (Professional Laminator system, model PL1200HP) at speed setting of 3. The entire construction was cured under high intensity bulbs (Fusion UV-Light hammer 6 with H bulbs, RPC industries Model Number I6P1/LH) at 30 ft/min (9.1 m/min).

After removing the release liners the resulting adhesive was inspected under an optical microscope. The structured interface was observed to have been replicated with high fidelity and no visual artifacts (such as a high haze or low clarity) were observed. A green laser pointer was used to shine a laser light having a wavelength of 532 nm through the adhesive. A two-directional diffraction pattern was observed.

Example 7

The material made in Example 6 was used as the starting material. The release treated film replicate was removed exposing the cured structures. ADH3 was coated with a bench top knife coater over the top of the exposed structure. The material was pulled through the knife coater by hand and the gap had been set to 4 mils (102 microns). The material was placed in an oven at 70° C. for 5 min. An RF Release Liner was laminated to the final construction, after the construction had been removed from the oven, with a hand roller using light pressure.

After removing the release liners the resulting adhesive was inspected under an optical microscope. The structured interface was observed to have been replicated with high fidelity and no visual artifacts (such as a high haze or low clarity) were observed. A green laser pointer was used to shine a laser light having a wavelength of 532 nm through the adhesive. A diffraction pattern was observed with nine relatively high intensity peaks observed in a square pattern. Additional lower intensity peaks were also observed.

Example 8

PRIPOL was coated onto the release treated film replicate described under "Release Tool" and placed in an oven at 70° C. for 5 min, to evaporate the solvent. ADH1 was laminated to the primer layer using a hand roller and used to remove the primer from the release treated film replicate. ADH3 was coated with a bench top knife coater over the top of the exposed structure. The material was pulled through the knife coater by hand and the gap had been set to 4 mils (102 microns). The material was placed in an oven at 70° C. for 5 min. An RF Release Liner was laminated to the final construction, after the construction had been removed from the oven, with a hand roller using light pressure.

After removing the release liners the resulting adhesive was inspected under an optical microscope. The structured interface was observed to have been replicated with high fidelity and no visual artifacts (such as a high haze or low clarity) were observed. A green laser pointer was used to shine a laser light having a wavelength of 532 nm through the adhesive. A linear diffraction pattern was observed with three relatively high intensity peaks observed. Additional much lower intensity peaks were also observed.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical adhesive comprising:
   a first viscoelastic or elastomeric adhesive layer having a first refractive index $n_1$;
   a first crosslinked or soluble resin layer immediately adjacent the first viscoelastic or elastomeric adhesive layer, the first crosslinked or soluble resin layer having a second refractive index $n_2$ different from the first refractive index $n_1$;
   a second viscoelastic or elastomeric adhesive layer immediately adjacent the first crosslinked or soluble resin layer opposite the first viscoelastic or elastomeric adhesive layer;
   wherein a first interface between the first viscoelastic or elastomeric adhesive layer and the first crosslinked or soluble resin layer is structured and wherein each of the first viscoelastic or elastomeric adhesive layer, the first crosslinked or soluble resin layer and the second viscoelastic or elastomeric adhesive layer are substantially transmissive,
   wherein the first interface includes a grating having a peak to valley height h and a pitch and wherein h multiplied by $|n_1-n_2|$ is in a range of about 150 nm to about 350 nm and the pitch is in a range of about 2 microns to about 50 microns.

2. The optical adhesive of claim 1, wherein a second interface between the first crosslinked or soluble resin layer and the second viscoelastic or elastomeric adhesive layer is structured.

3. The optical adhesive of claim 1, wherein the first viscoelastic or elastomeric adhesive layer is a first viscoelastic optically clear adhesive and the second viscoelastic or elastomeric adhesive layer is a second viscoelastic optically clear adhesive.

4. The optical adhesive of claim 1, wherein a refractive index contrast across the first interface is at least 0.001 and less than about 0.5.

5. The optical adhesive of claim 1, wherein the first crosslinked or soluble resin layer is substantially continuous.

6. The optical adhesive of claim 1, wherein the first crosslinked or soluble resin layer is discontinuous.

7. The optical adhesive of claim 6, wherein the first crosslinked or soluble resin layer comprises a plurality of discrete objects in a pattern.

8. The optical adhesive of claim 1, wherein the first crosslinked or soluble resin layer comprises a first sublayer immediately adjacent the first viscoelastic or elastomeric resin layer and a second sublayer immediately adjacent the first sublayer and immediately adjacent the second viscoelastic or elastomeric adhesive layer, wherein the first sublayer has a first refractive index and the second sublayer has a second refractive index different from the first refractive index of the first sublayer and a second interface between the first sublayer and the second sublayer is structured.

9. The optical adhesive of claim 1, further comprising a second crosslinked or soluble resin layer immediately adjacent the second viscoelastic or elastomeric adhesive layer opposite the first crosslinked or soluble resin layer.

10. The optical adhesive of claim 9, further comprising a third viscoelastic or elastomeric adhesive layer immediately adjacent the second crosslinked or soluble resin layer opposite the second viscoelastic or elastomeric adhesive layer.

11. The optical adhesive of claim 10, wherein at least two of the first interface, a second interface between the first crosslinked or soluble resin layer and the second viscoelastic or elastomeric adhesive layer, a third interface between the second crosslinked or soluble resin layer and the second viscoelastic or elastomeric adhesive layer, and a fourth interface between the third viscoelastic or elastomeric adhesive layer and the second crosslinked or soluble resin are structured.

12. The optical adhesive of claim 11, wherein the first, second, third and fourth interfaces includes a first grating extending in a first direction and a second grating extending in a second direction different from the first direction.

13. The optical adhesive of claim 1, wherein at least one of the first viscoelastic or elastomeric adhesive layer, the first crosslinked or soluble resin layer, and the second viscoelastic or elastomeric adhesive layer includes a plurality of particles having a mean diameter in the range of about 0.5 microns to about 30 microns, and wherein an absolute value of a refractive index difference between particles in the plurality of particles and a medium in which they are located is in the range of about 0.001 to about 0.1.

* * * * *